Figure 1:
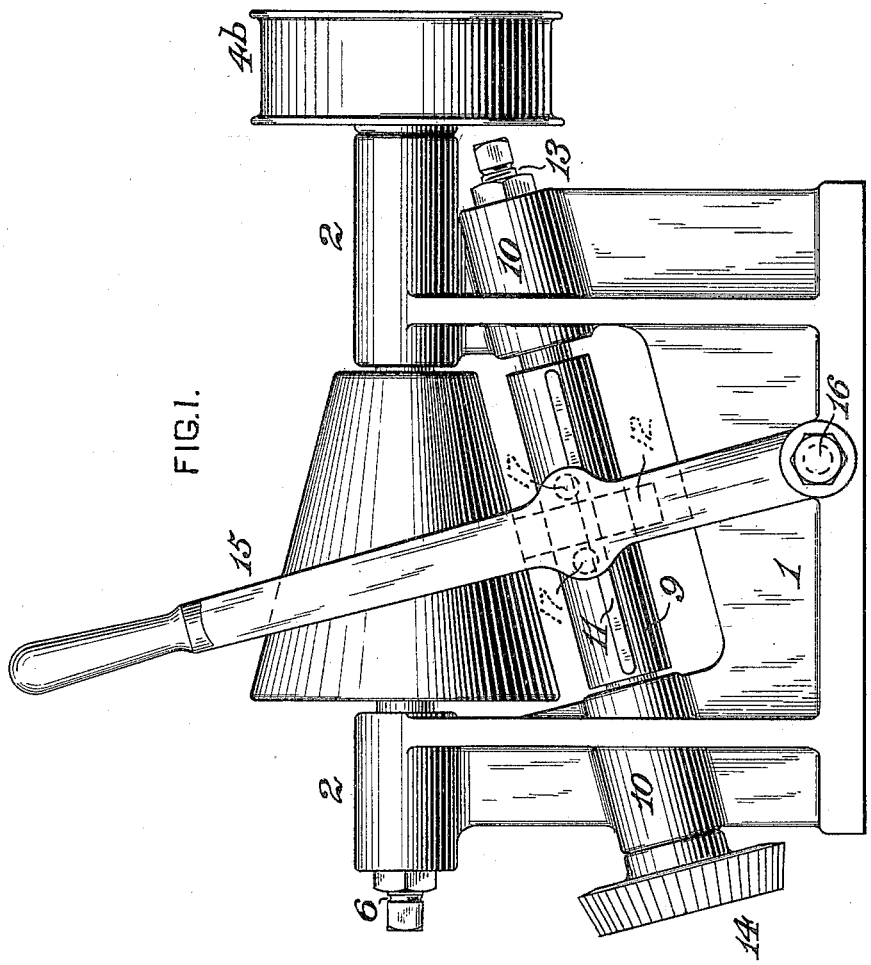

No. 680,916. Patented Aug. 20, 1901.
W. S. HALSEY.
SPEED VARYING MECHANISM.
(Application filed Sept. 22, 1899.)

(No Model.) 2 Sheets—Sheet 1.

WITNESSES:
James C. Herron.
S. R. Bell.

INVENTOR
William S. Halsey
by J. Snowden Bell
Att'y.

No. 680,916. Patented Aug. 20, 1901.
W. S. HALSEY.
SPEED VARYING MECHANISM.
(Application filed Sept. 22, 1899.)
(No Model.) 2 Sheets—Sheet 2.
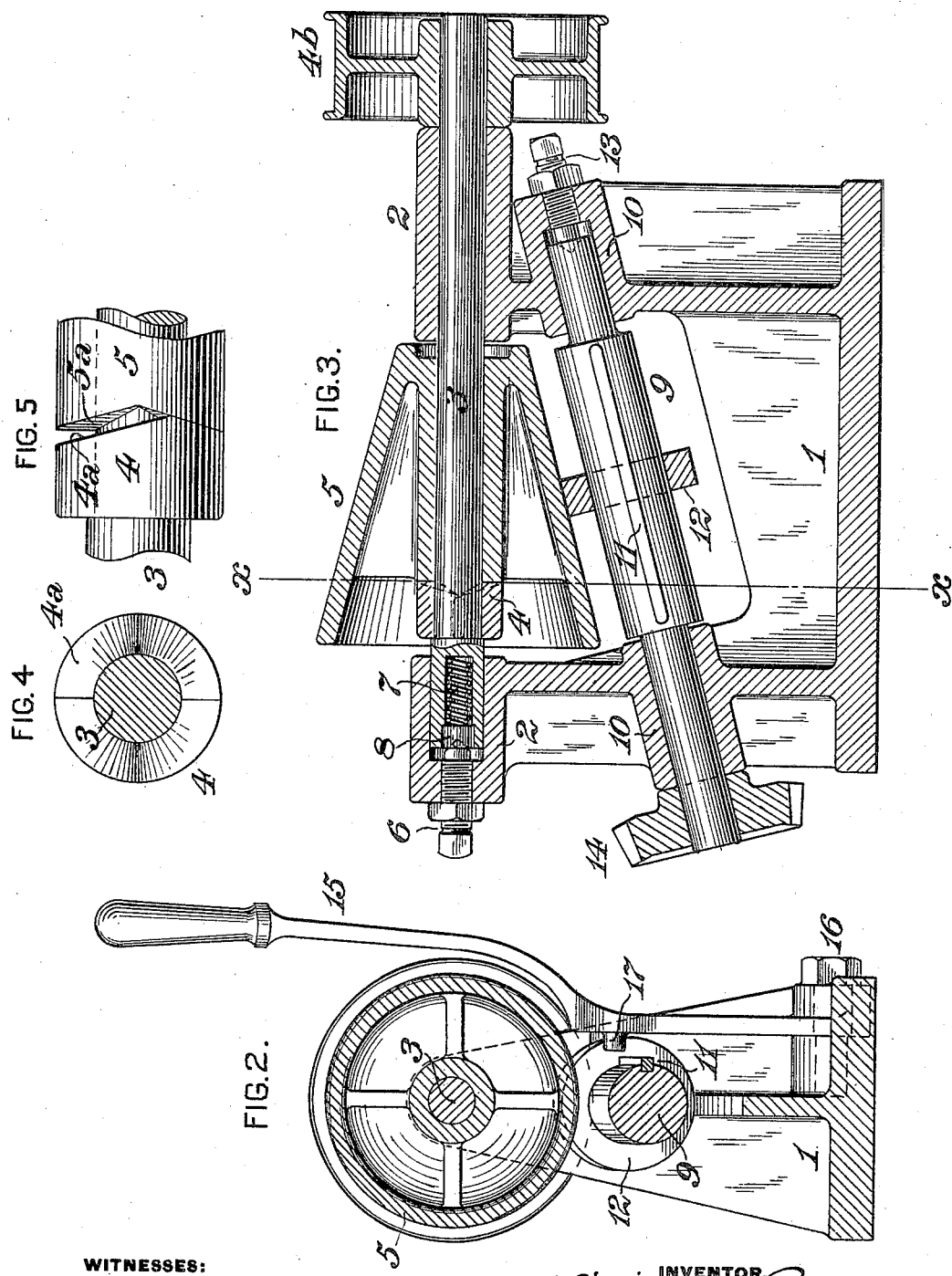

UNITED STATES PATENT OFFICE.

WILLIAM S. HALSEY, OF PITTSBURG, PENNSYLVANIA.

SPEED-VARYING MECHANISM.

SPECIFICATION forming part of Letters Patent No. 680,916, dated August 20, 1901.

Application filed September 22, 1899. Serial No. 731,270. (No model.)

*To all whom it may concern:*

Be it known that I, WILLIAM S. HALSEY, of Pittsburg, in the county of Allegheny and State of Pennsylvania, have invented a certain new and useful Improvement in Speed-Varying Mechanism, of which improvement the following is a specification.

The object of my invention is to provide a simple and effective mechanism whereby the rotative speed of a driven shaft may be varied as desired relatively to that of a driving-shaft which rotates at a uniform determined rate of speed.

To this end my invention, generally stated, consists in the combination of a driving-shaft, a driven shaft, a driving-wheel mounted loosely on the driving-shaft, a driven wheel rotatable with and movable longitudinally on the driven shaft in contact with the driving-wheel, helical inclines through which rotative pressure is imposed upon the driving-wheel, and means for moving the driven wheel relatively to the axis of the driving-shaft.

The improvement claimed is hereinafter fully set forth.

In the accompanying drawings, Figure 1 is a side view in elevation of a speed-varying mechanism, illustrating an application of my invention; Fig. 2, a transverse section through the same on the line $x\ x$ of Fig. 3; Fig. 3, a vertical central section; Fig. 4, an end view, on an enlarged scale, of the driving-collar; and Fig. 5, a side view of the same and of the adjacent portion of the hub of the driving-wheel.

In the practice of my invention I provide a supporting frame or bed 1, having suitable bearings 2, in which a main or driving shaft 3 is mounted. The driving-shaft is in this instance shown as carrying a driving-pulley $4^b$, to which rotation at a uniform determined speed is imparted by a belt passing around a pulley which is rotated by any suitable prime mover. It will, however, be obvious that the driving-motor may, if desired, be directly connected to the driving-shaft 3.

A frictional driving-wheel 5, which is shown as of conical form, is mounted loosely on the driving-shaft, and the end thrust of said shaft is taken upon an adjustable set-screw 6, engaging a thread in the frame 1, the point of said set-screw bearing on a washer 8, to which the end thrust of the driving-shaft is transmitted through a spring 7, fitting in an end recess therein.

A collar 4 is fixed upon the driving-shaft adjoining the end of the hub of the driving-wheel 5, which is nearer the larger diameter thereof, and the adjacent faces of the collar and hub are each provided with a helical incline $4^a\ 5^a$, respectively, said inclines corresponding in direction and pitch on the two members, so that when abutting under pressure they will constitute continuous driving-surfaces. Where, as in the instance illustrated, the driving-shaft is to be adapted to rotate the driven shaft in either direction, the collar and driving-wheel hub must each be provided with helical inclines of alternately opposite inclination, as shown in Figs. 4 and 5; but if rotation in one direction only is desired the inclines lead only in one direction, the abutting faces of the two members being formed in the manner of a clutch or saw-tooth coupling.

A driven shaft or counter-shaft 9 is mounted in bearings 10 on the frame, said shaft carrying a frictional driven wheel 12, which is fitted on a longitudinal key or feather 11. The inclination of the driven shaft and the diameter of the wheel 12 are such that the periphery of said wheel shall always be in contact with an equal length of the periphery of the driving-wheel 5 in order that the former may be rotatable by the latter in any and all positions within its range of traverse upon the feather 11. The end thrust of the driven shaft is taken upon a set-screw 13, and it carries a bevel-gear 14 or a pulley, if preferred, through which its movement may be transmitted to the shaft which is to be finally rotated or the mechanism or device which is to be actuated. The driven wheel 12 is moved longitudinally upon the feather 11, and consequently toward or from the axis of the driving-shaft, in accordance with the direction of its movement, by a shifting-lever 15, pivoted by a pin 16 to the frame and carrying studs or projections 17, one or the other of which when the lever is moved upon its pivotal axis bears against the adjacent side of the driven wheel 12 and moves the same on its feather correspondingly with and proportionately to the direction and range of traverse of the shifting-lever 15.

In the operation of the mechanism when the driving-shaft 3 is rotated in either direction the pressure of one of the helical inclines of the collar 4 against the adjacent helical incline of the hub of the driving-wheel 5 would if unopposed move said wheel longitudinally on the driving-shaft in the direction of its smaller diameter; but such movement being resisted and prevented by the contact of the wheel 12 with the driving-wheel 5 the latter is pressed against the former with such force as to compel the wheel 5 to rotate with the driving-shaft and by its frictional contact with the wheel 12 to rotate the same and the driven shaft 9, on which it is mounted. The angle of the line of contact of the peripheries of the driving and driven wheels with the axial line of the driving-wheel not being varied by longitudinal movement of the driven wheel on the shaft 9, such movement consequently does not effect either increase or diminution of the constant resistance imposed by the driven wheel to the longitudinal movement of the driving-wheel, which movement is therefore impossible, regardless of the condition of rest or motion or the direction of motion of the driven wheel. For the same reason the resistance to the longitudinal movement of the driven wheel when such movement is desired is that due to the frictional contact of the driving-wheel and is uniform throughout and in either direction of longitudinal movement of the driven wheel. The speed of the driven shaft will of course be greater or less accordingly as the wheel 12 is brought nearer to or moved farther from the larger diameter of the driving-wheel 5 by appropriate movement of the shifting-lever 15 in one or the other direction.

My invention presents in practice a substantial advantage over constructions embodying a driving-wheel which is fixed to the shaft in the particular that the degree of frictional driving contact of the driving and driven wheels is variable by and directly proportionate to variations in the resistance imposed upon or power required to be transmitted by the driven shaft. The driving and driven wheels are therefore under all conditions maintained in contact only with that degree of force which is normal and necessary to effect the rotation of the driven shaft for any determined resistance or load and without being subject to the undue and unnecessary wear which would result if they were invariably engaged with the frictional contact required to effect rotation of the driven shaft under the maximum resistance or load for which it is adapted.

It will be obvious to those skilled in the art to which my invention relates that the structural details thereof may be materially varied from those of the example illustrated without departure from the governing principle and leading features of my invention. Thus, for example, the driving-wheel might be a disk instead of a cone and the driven wheel be traversed toward and from its axial line transversely thereto instead of at an angle therewith, as in the instance shown. Other structural variations embodying the same essential operative principle can readily occur to the skilled constructor, and I do not therefore limit myself to the specific construction which is herein described and shown.

I claim as my invention and desire to secure by Letters Patent—

1. In a speed-varying mechanism, the combination of a driving-shaft, a driven shaft, a driving-wheel mounted loosely on the driving-shaft, a driven wheel rotatable with and movable longitudinally on the driven shaft, in contact with the driving-wheel, means for imposing rotative pressure upon the driving-wheel through the contact of helical inclines, and means for moving the driven wheel relatively to the axis of the driving-shaft.

2. In a speed-varying mechanism, the combination of a driving-shaft, a frictional driving-wheel mounted loosely thereon, a driven shaft, a frictional driven wheel, rotatable therewith and movable thereon in contact with the driving-wheel, a pressure-imposing device comprising helical inclines on the driving-wheel and on an abutting member fixed to the driving-shaft, and means for moving the driven wheel toward and from the axis of the driving-shaft.

3. In a speed-varying mechanism, the combination of a driving-shaft, a frictional driving-wheel mounted loosely thereon, a collar fixed on the driving-shaft and provided with a helical incline adapted to abut against a corresponding incline on the driving-wheel, a driven shaft, a frictional driven wheel rotatable therewith and movable thereon in contact with the driving-wheel, and means for moving the driven wheel toward and from the axis of the driving-shaft.

4. In a speed-varying mechanism, the combination of a driving-shaft, a conical frictional driving-wheel mounted loosely thereon and having a helical incline on one end of its hub, a collar fixed to the driving-shaft, and having a helical incline adapted to abut against that of the driving-wheel, a driven shaft journaled at an angle with the driving-shaft, a frictional driven wheel fitted to traverse on a longitudinal feather on the driven shaft and having its periphery in contact with that of the driving-wheel, and a pivoted shifting-lever for effecting the longitudinal movement of the driven wheel.

WILLIAM S. HALSEY.

Witnesses:
  J. SNOWDEN BELL,
  CLARENCE A. WILLIAMS.